(12) United States Patent
Kanda et al.

(10) Patent No.: US 9,029,482 B2
(45) Date of Patent: May 12, 2015

(54) METHOD FOR PREPARING POLYCONDENSATION RESIN

(71) Applicant: Cheil Industries Inc., Gumi-si (KR)

(72) Inventors: Tomomich Kanda, Yokohamashi (JP); Shimoda Tomoaki, Yokohamashi (JP); Bok Nam Jang, Uiwang-si (KR); Seung Hyun Jang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 122 days.

(21) Appl. No.: 13/707,775

(22) Filed: Dec. 7, 2012

(65) Prior Publication Data
US 2013/0165621 A1  Jun. 27, 2013

(30) Foreign Application Priority Data

Dec. 14, 2011 (JP) ................. 2011-273248
Dec. 14, 2011 (JP) ................. 2011-273252
Dec. 14, 2011 (JP) ................. 2011-273256

(51) Int. Cl.
| | |
|---|---|
| *C08L 67/02* | (2006.01) |
| *C08F 2/36* | (2006.01) |
| *C08G 69/30* | (2006.01) |
| *C08G 63/60* | (2006.01) |
| *C08G 63/80* | (2006.01) |
| *C08G 64/30* | (2006.01) |
| *C08G 69/26* | (2006.01) |

(52) U.S. Cl.
CPC . *C08F 2/36* (2013.01); *C08G 69/30* (2013.01); *C08G 63/605* (2013.01); *C08G 63/80* (2013.01); *C08G 64/307* (2013.01); *C08G 69/265* (2013.01)

(58) Field of Classification Search
CPC ....... C08L 67/02; C08G 63/80; C08G 63/183
USPC ........................................ 525/425, 437, 450
See application file for complete search history.

(56) References Cited

U.S. PATENT DOCUMENTS

| | | | | |
|---|---|---|---|---|
| 2,163,636 | A | * | 6/1939 | Spanagel ................. 528/335 |
| 4,757,131 | A | | 7/1988 | Bongers et al. |
| 4,778,858 | A | * | 10/1988 | Ginnings ................. 525/425 |
| 4,814,356 | A | | 3/1989 | Bongers et al. |
| 6,812,319 | B2 | | 11/2004 | Sakurai et al. |
| 2007/0135613 | A1 | * | 6/2007 | Christel et al. ............ 528/272 |
| 2009/0312500 | A1 | * | 12/2009 | Awojulu et al. ............ 525/403 |

FOREIGN PATENT DOCUMENTS

| | | |
|---|---|---|
| JP | 07-090077 A | 4/1995 |
| JP | 2003-292604 A | 10/2003 |
| WO | 02/31022 A1 | 4/2002 |

OTHER PUBLICATIONS

Japanese Office Action in counterpart Application No. 2011-273256 dated Sep. 24, 2013, pp. 1-4.

* cited by examiner

*Primary Examiner* — Gregory Listvoyb
(74) *Attorney, Agent, or Firm* — Additon, Higgins & Pendleton, P.A.

(57) ABSTRACT

Disclosed herein is a method for preparing a polycondensation resin. The method includes preparing a low degree condensate; and solid phase polymerizing the low degree condensate, wherein a granular molded article is introduced into the solid phase polymerization. The method enables efficient manufacture of high quality resins without problems such as agglomeration or scaling of a low degree condensate in pipes.

19 Claims, No Drawings

METHOD FOR PREPARING POLYCONDENSATION RESIN

FIELD OF THE INVENTION

The present invention relates to a method for preparing a polycondensation resin. More particularly, the present invention relates to a method for preparing a polycondensation resin enabling efficient preparation of a high quality resin without any problems such as agglomeration of low degree condensates or scaling of low degree condensates by introducing granular molded articles upon solid phase polymerization.

DESCRIPTION OF THE RELATED ART

Polycondensation resins such as polyamides, polycarbonates, polyesters, and the like are used in various fields including optics, automobiles, electric and electronic applications, various containers, and the like. As a method for preparing such a polycondensation resin, a method for preparing a high molecular weight polycondensation resin, which includes preparing a low degree condensate of a low molecular weight polycondensation resin, crystallizing and/or granulating the condensate, followed by solid phase polymerization under vacuum or inert gas atmosphere, is known in the art.

For example, Japanese Patent Publication No. H1-158033A discloses a high molecular weight polymerization technology through solid phase polymerization of low molecular weight crystalline aromatic polycarbonates (low degree condensates). However, this method has disadvantages in that low degree condensates are agglomerated, causing scaling in pipes or adhesion in a large quantity to an inner wall of instruments.

SUMMARY OF THE INVENTION

An aspect of the present invention provides a method for preparing a polycondensation resin capable of manufacturing a high quality resin efficiently without any problems such as agglomeration of low degree condensates or scaling of low degree condensates in pipes.

The method for preparing a polycondensation resin includes: preparing a low degree condensate; and solid phase polymerizing the low degree condensate, wherein a granular molded article is provided upon the solid phase polymerization.

In one embodiment, the granular molded article may be a granular compression-molded article of the low degree condensate.

In another embodiment, the granular molded article may be a granular molded article of a thermoplastic resin. In this case, the low degree condensate is prepared in the form of crystalline powder, and the crystalline powder of the low degree condensate and the granular molded article of the thermoplastic resin may be mixed to carry out solid phase polymerization.

The granular molded article of the thermoplastic resins may be the same resin as the low degree condensate.

The granular molded article of the thermoplastic resins may have an inherent viscosity of about 0.3 dl/g to about 5 dl/g as measured at a concentration of 0.5 g/dl.

The polycondensation resin may be a polyamide, polycarbonate or polyester resin.

The solid phase polymerization may have a maximum reaction temperature of about 170° C. to about 350° C.

The low degree condensate may be prepared by polycondensation of a dicarboxylic acid and a diamine, wherein at the end of polycondensation, the moisture content in a reaction system may range from about 15 wt % to about 35 wt %.

The preparing the low degree condensate may be performed at a reaction temperature of about 230° C. to about 250° C.

The preparing the low degree condensate may be performed under a reaction pressure ranging from about 1.5 MPa to about 3.5 MPa and a reaction time ranging from about 0.5 hours to about 4.0 hours.

The low degree condensate may be introduced into the solid phase polymerization after being discharged and cooled under an inert gas atmosphere and atmospheric pressure or less.

The cooled low degree condensate has an inherent viscosity of about 0.07 dl/g to about 0.20 dl/g as measured at a temperature of 25° C. and at a concentration of 0.5 g/dl in concentrated sulfuric acid, and 5 wt % reduction temperature of about 300° C. or more as measured by thermogravimetry under a nitrogen atmosphere.

The inert gas may have an oxygen concentration of about 1% by volume or less. In the cooling, the low degree condensate may be cooled to about 100° C. or less.

The dicarboxylic acid may be comprised of about 30 mol % to about 100 mol % of terephthalic acid and about 0 mol % to about 70 mol % of dicarboxylic acid except for terephthalic acid. The diamine may include about 50 mol % to about 100 mol % of a $C_4$ to $C_{25}$ aliphatic alkylene diamine and about 0 mol % to about 50 mol % of a $C_3$ to $C_{25}$ cycloaliphatic diamine.

DETAILED DESCRIPTION OF THE INVENTION

In accordance with an aspect, the present invention provides a method for preparing a polycondensation resin, which includes: preparing a low degree condensate; and solid phase polymerizing the low degree condensate, wherein a granular molded article is introduced into the solid phase polymerization.

In a first embodiment, the granular molded article may be a granular compression-molded article of the low degree condensate.

In a second embodiment, the granular molded article may be a granular molded article of thermoplastic resins.

In a third embodiment, the low degree condensate may be prepared by polycondensation of a dicarboxylic acid and a diamine, wherein at the end of the polycondensation, the moisture content in a reaction system may range from about 15 wt % to about 35 wt %.

Hereinafter, each embodiment will be explained in greater detail.

First Embodiment

According to the first embodiment, a polycondensation resin may be prepared by a method, which includes preparing a low degree condensate; compression molding the low degree condensate to yield a granular compression-molded article of the low degree condensate; and solid phase polymerizing the granular compression-molded article of the low degree condensate.

<Process for Preparing Low Degree Condensate>

In this process, polycondensation may be carried out to prepare a low degree condensate of the polycondensation resins.

The polycondensation resins are not particularly limited, but in terms of industrial scale production, the polycondensation resins are preferably polyamides, polycarbonates or polyesters, more preferably, polyamides. Monomers and catalysts used in synthesis of the polyamides, polycarbonates and polyesters will be explained below.

<<Polyamide>>

Polyamides may be obtained by polycondensation of a dicarboxylic acid and a diamine.

Examples of the dicarboxylic acid may include aliphatic dicarboxylic acids such as terephthalic acid, malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, suberic acid, azelaic acid, sebacic acid, undecanoic diacid, dodecanoic diacid, and the like; cycloaliphatic dicarboxylic acids such as 1,3-cyclopentane dicarboxylic acid, 1,4-cyclohexane dicarboxylic acid, and the like; and aromatic dicarboxylic acids such as isophthalic acid, 2,6-naphthalene dicarboxylic acid, 2,7-naphthalene dicarboxylic acid, 1,4-naphthalene dicarboxylic acid, 1,4-phenylene dioxydiacetic acid, 1,3-phenylene dioxydiacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and the like. These dicarboxylic acids may be used alone or in combination of two or more thereof. Further, as needed, multi-valent carboxylic acid components such as trimellitic acid, trimesic acid, pyromellitic acid, and the like may be used in a small amount.

Further, examples of the diamine may include aliphatic alkylene diamines such as ethylene diamine, propane diamine, 1,4-butane diamine, 1,6-hexane diamine(hexamethylene diamine), 1,7-heptane diamine, 1,8-octane diamine, 1,9-nonane diamine, 1,10-decane diamine, 1,11-undecane diamine, 1,12-dodecane diamine, 2-methyl-1,5-pentane diamine, 3-methyl-1,5-pentane diamine, 2,2,4-trimethyl-1,6-hexane diamine, 2,4,4-trimethyl-1,6-hexane diamine, 2-methyl-1,8-octane diamine, 5-methyl-1,9-nonane diamine, metaxylylene diamine, paraxylylene diamine, and the like; cycloaliphatic diamines such as cyclohexane diamine, methylcyclohexane diamine, isophorone diamine, bis(4-aminocyclohexyl)methane, 1,3-bisaminomethylcyclohexane, 1,4-bisaminomethylcyclohexane, norbornane dimethaneamine, tricyclodecane dimethaneamine, and the like; and aromatic diamines such as p-phenylene diamine, m-phenylene diamine, 4,4'-diaminodiphenylsulfone, 4,4'-diaminodiphenylether, and the like. These diamines may be used alone or in combination of two or more thereof.

The combination of those dicarboxylic acids and diamines is not particularly limited, but in terms of heat resistance, mechanical strength and mold processability of the polyamide prepared, it is desirable that the dicarboxylic acid be composed of about 30 to about 100 mol % of terephthalic acid and about 0 to about 70 mol % of dicarboxylic acid except for terephthalic acid, and that the diamine be composed of about 50 to about 100 mol % of a $C_4$ to $C_{25}$ aliphatic alkylene diamine and about 0 to about 50 mol % of a $C_3$ to $C_{25}$ cycloaliphatic diamine.

The low degree condensate may be synthesized by introducing an aqueous solution of the monomer or salt into, for example, a conventional pressurized polymerization bath and subjecting the same to polycondensation in an aqueous solvent while stirring.

The aqueous solvent refers to a solvent that contains water as a main ingredient. Usable solvents besides water are not particularly limited so long as the solvents do not affect polycondensation reactivity or solubility. For example, the solvents may be alcohols, such as methanol, ethanol, propanol, butanol, ethylene glycol, and the like.

The moisture content in a reaction system upon initiating polycondensation is not particularly limited so long as the moisture content ranges from about 15 wt % to about 35 wt % in the reaction system upon completion of the reaction. The moisture content may range from about 20 wt % to about 33 wt %. When the moisture content in the reaction system upon initiating polycondensation is about 15 wt % or more, a homogeneous solution may be obtained at an initial stage of polycondensation. When the moisture content in the reaction system upon initiating polycondensation is about 35 wt % or less, removal of moisture by distillation during polycondensation may not require excessive time and energy, and may not be affected by thermal deterioration due to extension of the reaction time.

In the polycondensation process, phosphorus catalysts may be used to increase polycondensation rate and prevent deterioration upon polycondensation. Examples of the phosphorus catalysts may include hypophosphite, phosphate, hypophosphorous acid, phosphoric acid, phosphate ester, polymetaphosphates, polyphosphates, phosphine oxides, phosphonium halogen compounds, and the like. Specifically, hypophosphite, phosphate, hypophosphorous acid and phosphoric acid are preferably used. Examples of the hypophosphite may include sodium hypophosphite, potassium hypophosphite, calcium hypophosphite, magnesium hypophosphite, aluminum hypophosphite, vanadium hypophosphite, manganese hypophosphite, zinc hypophosphite, lead hypophosphite, nickel hypophosphite, cobalt hypophosphite, ammonium hypophosphite, and the like. More preferably, sodium hypophosphite, potassium hypophosphite, calcium hypophosphite and magnesium hypophosphite are used. Examples of the phosphate may include sodium phosphate, potassium phosphate, potassium dihydrogen phosphate, calcium phosphate, vanadium phosphate, magnesium phosphate, manganese phosphate, lead phosphate, nickel phosphate, cobalt phosphate, ammonium phosphate, diammonium hydrogen phosphate, and the like. The phosphate ester may be, for example, ethyloctadecyl phosphate and the like. Examples of the polymetaphosphates may include sodium trimetaphosphate, sodium pentametaphosphate, sodium hexametaphosphate, polymeta phosphate, and the like. The polyphosphoric acid may include sodium tetrapolyphosphate, and the like. The phosphine oxide may include hexamethyl phosphoramide, and the like.

The phosphorus catalyst is preferably present in an amount of about 0.0001 parts by weight to about 5 parts by weight, more preferably about 0.001 parts by weight to about 1 part by weight, based on 100 parts by weight of charged raw materials. The phosphorus catalyst may be added at any time before solid phase polymerization is completed, however, the phosphorus catalyst is preferably added between charging of the raw materials and the completion of polycondensation of low degree condensates. Further, the phosphorus catalyst may be introduced multiple times. Also, two or more of other phosphorus catalysts may be combined.

In addition, polycondensation may be carried out in the presence of end-capping agents. When the end capping agents are used, the molecular weight of the low degree condensate may be easily controlled, and melt stability of the low degree condensate may be improved. The end capping agents are not particularly limited so long as the end capping agents are mono-functional compounds having reactivity with a terminal amino group or a terminal carboxylic group. Examples of the end capping agents may include monocarboxylic acids, monoamines, acid anhydrides such as anhydrous phthalic acid and the like, monoisocyanate, monoacid halides, monoesters, monoalcohols, and the like. Among these, monocarboxylic acids or monoamines are preferably used in terms of reactivity and stability of the end capping agents. In addition to the aforementioned properties, monocarboxylic acids are more preferably used for easy handling.

The monocarboxylic acids preferably used as the end capping agents are not particularly limited so long as the monocarboxylic acids are reactive with an amino group. Examples of the monocarboxylic acids may include aliphatic monocarboxylic acids such as acetic acid, propionic acid, butyric acid, valeric acid, caproic acid, caprillic acid, lauric acid, tridecylic acid, myristic acid, palmitic acid, stearic acid, pivalic acid, isobutyric acid, and the like; cycloaliphatic monocarboxylic acids such as cyclohexane carboxylic acid, and the like; aromatic monocarboxylic acids such as benzoic acid, toluphosphoric acid, α-naphthalene carboxylic acid, β-naphthalene carboxylic acid, methylnaphthalene carboxylic acid, phenylacetic acid, and the like; and mixtures thereof. Among these, acetic acid, propionic acid, butyric acid, valeric acid, caproic acid, caprillic acid, lauric acid, tridecylic acid, myristic acid, palmitic acid, stearic acid, benzoic acid, and the like are specifically preferably used in terms of reactivity, stability of end capping, price, and the like.

The monoamines preferably used as the end capping agents are not particularly limited so long as the monoamines have reactivity with a carboxylic group. Examples of the monoamines preferably used as the end capping agents may include aliphatic monoamines such as methylamine, ethylamine, propylamine, butylamine, hexylamine, octylamine, decylamine, stearylamine, dimethylamine, diethylamine, dipropylamine, dibutylamine, and the like; cycloaliphatic monoamines such as cyclohexylamine, dicyclohexylamine, and the like; aromatic monoamines such as aniline, toluidine, diphenyl amine, naphthylamine, and the like; and mixtures thereof. Among these, butylamine, hexylamine, octylamine, decylamine, stearylamine, cyclohexylamine and aniline are specifically preferably used in terms of reactivity, melting point, stability of end capping, price, and the like.

The amount of the end capping agents used in preparation of a low degree condensate of the polyamide may depend on the reactivity and melting point of the end capping agents, reaction apparatuses, reaction conditions of the end capping agents, and the like. The end capping agent may be present in an amount of about 0.1 mol % to about 15 mol % in the dicarboxylic acid or the diamine.

Synthesis of the low degree condensate according to the present invention may be performed at elevated temperature and pressure under stirring. The polymerization temperature may be controlled after introducing the raw materials. In addition, the polymerization pressure may be controlled depending on the progress of polymerization.

In this process, the reaction temperature may range from about 230° C. to about 250° C. Within this temperature range, the molecular weight of the low degree condensate can be sufficiently increased without changing the color of polyamide.

In this process, the reaction pressure may range from about 1.5 MPa to about 3.5 MPa. Within this range, the temperature and moisture content in a reaction system can be easily controlled, water can be easily discharged, and the degree of polymerization of the low degree condensate can be increased. Preferably, the reaction pressure ranges from about 2.0 MPa to about 3.5 MPa.

Further, in this process, the reaction time may range from about 0.5 hours to about 4 hours. Herein, the reaction time refers to a period of time from a time point of reaching the reaction temperature of the present invention to initiation of discharging operation. Within this range, reaction can reach sufficient reaction rate, whereby unreacted materials do not remain in the system and low degree condensates of homogeneous characteristics can be obtained without excessive thermal history. The reaction time preferably ranges from about 1 hour to about 3 hours.

The moisture content in a reaction system at the time of completion of the reaction of the low degree condensate in this process preferably ranges from about 15 wt % to about 35 wt %. Herein, the expression "at the time of completion of the reaction" refers to a time point when the low degree condensate has a certain degree of polymerization to initiate discharging operation. The moisture content may include a condensate generated during reaction. In order to keep the moisture content within the above mentioned range, a predetermined amount of water can be distilled off at the time of adjusting the reaction pressure in an apparatus equipped with a condenser and a pressure control valve. Within this range, since the low degree condensate is not precipitated or solified in the reaction system, discharge can be easily carried out, whereby a low degree condensate having a sufficient degree of polymerization can be obtained, and the rate of discharge can be enhanced. Preferably, the moisture content ranges from about 20 wt % to about 35 wt %.

In addition, optionally, prior to polymerization of the low degree condensate, a salt adjustment process and/or concentration process may also be added, as needed. The salt adjustment process refers to formation of a salt from a dicarboxylic acid component and a diamine component. The salt adjustment process may be regulated to pH±0.5 of the neutralization point of salts, and preferably to about pH±0.3 of the neutralization point of salts. In the concentration process, the concentration of the raw materials is preferably about +2 wt % to about +90 wt %, more preferably about +5 wt % to about +80 wt %. The concentration process is preferably performed at about 90° C. to about 220° C., more preferably at about 100° C. to about 210° C., still more preferably at about 130° C. to about 200° C. The pressure of the concentration process is preferably about 0.1 MPa to about 2.0 MPa. Conventionally, the pressure of the concentration process is not more than the polymerization pressure. In addition, in order to enhance the concentrating process, forced discharge by, for example, stream of nitrogen may be carried out. The concentration process is effective in shortening the polymerization time.

In this process, the low degree condensate may be reacted such that the inherent viscosity (hereinafter referred to as "IV") measured at a temperature of 25° C. and at a concentration of 0.5 g/dl in concentrated sulfuric acid ranges from about 0.07 dl/g to about 0.20 dl/g after taking out the low degree condensate from the reaction vessel (after cooling). Within this range, low melting point materials do not remain, and thus agglomeration or sticking of resin powder in an apparatus upon solid phase polymerization does not occur, thereby preventing precipitation or solidification of the low degree condensate. Preferably, the inherent viscosity ranges from about 0.09 dl/g to about 0.20 dl/g.

Furthermore, after the low degree condensate is taken out from the reaction vessel (after cooling), the low degree condensate may have a 5 wt % reduction temperature of about 300° C. or more, as measured by thermogravimetric analysis (TGA). When the 5 wt % reduction temperature is about 300° C. or more, unreacted reactants do not remain, and thus agglomeration or sticking of resin powder in an apparatus upon solid phase polymerization does not occur. Preferably, the 5 wt % reduction temperature is about 350° C. or more.

In this process, in order to obtain a low degree condensate, polycondensation may be performed in a batch mode or in a continuous mode. Further, polycondensation for producing a low degree condensate is preferably performed under stirring in order to inhibit sticking of the low degree condensate to the reaction vessel and to conduct uniform polymerization.

<<Polycarbonate>>

Polycarbonates are not particularly limited, but refer to polycarbonates having various structure units. Usually, aromatic polycarbonates may be prepared by reacting a divalent phenol with a carbonate precursor.

Examples of the divalent phenol may include 4,4'-dihydroxybiphenyl, bis(4-hydroxyphenyl)methane, 1,1-bis(4-hydroxyphenyl)ethane, 2,2-bis(4-hydroxyphenyl)propane (bisphenol A), 2,2-bis(3-methyl-4-hydroxyphenyl)propane, 2,2-bis(3,5-dimethyl-4-hydroxyphenyl)propane, 1,1-bis(4-hydroxyphenyl)cyclohexane, bis(4-hydroxyphenyl)ether, bis(4-hydroxyphenyl)sulfide, bis(4-hydroxyphenyl)sulfone, bis(4-hydroxyphenyl)sulfoxide, bis(4-hydroxyphenyl)ketone, hydroquinone, resorcin, cathecol, and the like.

In addition, examples of the divalent phenol may include hydroquinone, resorcinol, and the like. These divalent phenols may be used alone or in combination of two or more thereof.

Among these divalent phenols, bis(hydroxyphenyl)alkanes are preferable. In addition, divalent phenols based on 2,2-bis(4-hydroxyphenyl)propane are more preferable.

Further, examples of the carbonate precursor may include carbonyl halide, carbonyl ester, haloformate, and the like. Specifically, examples of the carbonate precursor may include dihaloformate, diphenyl carbonate, dimethyl carbonate, diethyl carbonate, and the like of phosgene, and divalent phenols.

In addition, the polycarbonates may have a straight chain as well as a branched molecular structure. Examples of a branching agent to introduce such a branched structure may include 1,1,1-tris(4-hydroxyphenyl)ethane, $\alpha,\alpha',\alpha''$-tris(4-hydroxyphenyl)-1,3,5-triisopropylbenzene, fluoroglucin, trimellitic acid, isatinbis(o-cresol), and the like. Further, phenols, p-t-butylphenol, p-t-octylphenol, p-cumylphenol, and the like may be used as a molecular weight regulator.

In this process, polycondensation may be accelerated by removing aromatic monohydroxy compounds and/or diaryl carbonates, which are by-products of polycondensation, from the system. Methods for extracting the by-products may include a process of conducting the reaction under reduced pressure, a process of removing by-products using inert gas through introduction of the inert gas, and combinations thereof.

In this process, polycondensation may be performed at a sufficient rate without adding a catalyst. However, a polymerization catalyst may be used to further enhance the reaction rate.

As the polymerization catalyst, any polymerization catalyst in the art may be used without limitation. Examples of the polymerization catalyst may include hydroxides of an alkali metal and an alkaline earth metal, such as lithium hydroxide, sodium hydroxide, potassium hydroxide, calcium hydroxide, and the like; alkali metal salts, alkaline earth metal salts, quaternary ammonium salts of hydrides of boron or aluminum such as lithium aluminum hydride, sodium borohydride, tetramethylammonium borohydride, and the like; hydrogen compounds of an alkali metal and an alkaline earth metal such as lithium hydride, sodium hydride, calcium hydride, and the like; alkoxides of an alkali metal and an alkaline earth metal such as lithium methoxide, sodium ethoxide, calcium methoxide, and the like; aryl oxides of an alkali metal and an alkaline earth metal such as lithium phenoxide, sodium phenoxide, magnesium phenoxide, LiO—Ar—OLi, NaO—Ar—ONa (Ar being an aryl group), and the like; organic acid salts of an alkali metal and an alkaline earth metal such as lithium acetate, calcium acetate, sodium benzoate, and the like; zinc compounds such as zinc oxide, zinc acetate, zinc phenoxide, and the like; boron compounds such as boron oxide, boric acid, sodium borate, trimethyl borate, tributyl borate, triphenyl borate, and the like; silicon compounds such as silicon oxide, sodium silicate, tetraalkyl silicate, tetraaryl silicate, diphenylethylethoxy silicate, and the like; germanium compounds such as germanium oxide, germanium tetrachloride, germanium ethoxide, germanium phenoxide, and the like; tin compounds bound with an alkoxy group or an aryloxyl group such as tin oxide, dialkyl tin oxide, dialkyltin carboxylate, tin acetate, ethyltin tributoxide, and the like, and tin compounds such as organic tin compounds; lead compounds such as lead oxide, lead acetate, lead carbonate, basic carbonate salt, alkoxide or aryloxide of lead and organic lead; onium compounds such as quaternary ammonium salts, quaternary phosphonium salts, quaternary arsonium salts, and the like; antimony compounds such as antimony oxide, antimony acetate, and the like; manganese compounds such as manganese acetate, manganese carbonate, manganese borate, and the like; titanium compounds such as titanium oxide, alkoxides of titanium or aryloixdes of titanium, and the like; and zirconium acetate, zirconium oxide, alkoxides of zirconium or aryloxides of zirconium, zirconium acetylacetone, and the like. These polymerization catalysts may be used alone or in combination of two or more thereof.

If the low degree condensate of the polycarbonate is in a molten or solution state, the low degree condensate may be processed by a crystallization solvent to obtain a powder product, a granular product, or the like.

The method of processing the low degree condensate of the polycarbonate in a crystallization solvent is not particularly limited, but usually includes a method of stirring the low degree condensate of the polycarbonate in the crystallization solvent and then crystallizing the condensate into a slurry state, or a method of mixing, kneading and crystallizing the low degree condensate and the crystallization solvent in a mixer or a kneader. In the case of crystallizing the low degree condensate into a slurry state, an apparatus having a high-speed stirring blade such as Waring blender and the like, or an apparatus equipped with a cutter adhered spiral pump and the like may be employed. Further, in the case of crystallizing the low degree condensate using a mixer or a kneader, a mixer or a kneader (see: Device disclosed on pages from 644 to 648 of Handbook of Mist Industrial, printed by Nikkan Kogyo Shimbun Co., Ltd.) may be used. Examples of such devices may include cone blenders, ribbon blenders, shovel mixers, pug mixers, Henschell mixers, blabenders, twin-shaft kneaders, and the like.

Examples of the crystallization solvent may include esters such as ethyl acetate, and the like; ethers such as diethylether, and the like; and ketones such as acetone, methylethylketone, and the like. In addition, although it may depend on the crystallization temperature, hydrocarbons such as hexane, octane, and the like; cyclic hydrocarbons such as cyclohexane and the like may be used as the crystallization solvent. Among these, acetone is preferably used since a low degree condensate of the polycarbonate having a high specific surface area can be prepared.

<<Polyester>>

Polyesters usable in the present invention are not particularly limited. Examples of polyesters may include polyesters obtained by reacting an acylated product of a compound having, for example, a phenolic hydroxyl group(s) with an aromatic carboxylic acid.

The acylated product used in the present invention may be any acylated product obtained by acylating an aromatic diol and/or phenolic hydroxyl group(s) of aromatic hydroxycarboxylic acid with a fatty acid anhydride. The aromatic carboxylic acid may be an aromatic dicarboxylic acid and/or an aromatic hydroxycarboxylic acid.

The compound having a phenolic hydroxyl group(s) may have one or two or more phenolic hydroxyl groups, but in terms of reactivity, the compound preferably has one or two phenolic hydroxyl groups. If the compound having phenolic hydroxyl group(s) has only one phenolic hydroxyl group, the compound preferably has an additional carboxylic group. As the compound having a phenolic hydroxyl group(s), aromatic diols and aromatic hydroxycarboxylic acids are particularly preferably used.

Examples of the aromatic diol may include 4,4'-dihydroxybiphenyl(4,4'-biphenol), hydroquinone, resorcine, methyl hydroquinone, chlorohydroquinone, acetoxyhydroquinone, nitrohydroquinone, 1,4-dihydroxynaphthalene, 1,5-dihydroxynaphthalene, 1,6-dihydroxynaphthalene, 2,6-dihydroxynaphthalene, 2,7-dihydroxynaphthalene, 2,2-bis(4-hydroxyphenyl)propane, 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis-(4-hydroxyphenyl)methane, bis-(4-hydroxy-3,5-dimethylphenyl)methane, bis-(4-hydroxy-3,5-dichlorophenyl)methane, bis-(4-hydroxy-3,5-dibromophenyl)methane, bis-(4-hydroxy-3-methylphenyl)methane, bis-(4-hydroxy-3-chlorophenyl)methane, 1,1-bis(4-hydroxyphenyl)cyclohexane, bis-(4-hydroxyphenyl)ether (4,4'-dihydroxydiphenylether), bis-(4-hydroxyphenyl)ketone, bis-(4-hydroxy-3,5-dimethylphenyl)ketone, bis-(4-hydroxy-3,5-dichlorophenyl)ketone, bis-(4-hydroxyphenyl)sulfide, and bis-(4-hydroxyphenyl)sulfone. These may be used alone or in combination of two or more thereof.

Among these, 4,4'-dihydroxybiphenyl, hydroquinone, resorcin, 2,6-dihydroxynaphthalene, 2,2-bis(4-hydroxyphenyl)propane or bis-(4-hydroxyphenyl)sulfone are preferably used since they are readily available.

Examples of the aromatic hydroxycarboxylic acid may include parahydroxybenzoic acid, metahydroxybenzoic acid, 2-hydroxy-6-naphthoic acid, 2-hydroxy-3-naphthoic acid, 1-hydroxy-4-naphthoic acid, 4-hydroxy-4'-carboxydiphenylether, 2,6-dichloro-parahydroxybenzoic acid, 2-chloro-parahydroxybenzoic acid, 2,6-difluoro-parahydroxybenzoic acid, and 4-hydroxy-4'-biphenylcarboxylic acid. These may be used alone or in combination of two or more thereof.

Among these, parahydroxybenzoic acid and 2-hydroxy-6-naphthoic acid are preferably used since they are readily available.

The acylated product may be obtained by acylating the compound having a phenolic hydroxyl group(s) as described above. Examples of the acylated product may include an acetylated product, without being limited thereto.

The acylated product may be obtained through reaction of a compound having phenolic hydroxyl groups with an acylating agent. Examples of the acylating agent may include acyl anhydrides or halogenides. The acyl group in the acylating agent may be derived from an aliphatic carboxylic acid such as alkanoic acid (acetic acid, propionic acid, butyric acid, pivalic acid, and the like), a higher alkanoic acid such as palmitic acid and the like, an aromatic carboxylic acid such as benzoic acid, and the like, and an aryl fatty acid such as phenylacetic acid, and the like.

As the acylating agent, a fatty acid anhydride is particularly preferable. Examples of the fatty acid anhydride may include anhydrous acetic acid, anhydrous propionic acid, anhydrous butyric acid, anhydrous isobutyric acid, anhydrous valeric acid, anhydrous pivalic acid, anhydrous 2-ethyl hexanoic acid, anhydrous monochloroacetic acid, anhydrous dichloroacetic acid, anhydrous trichloroacetic acid, anhydrous monobromoacetic acid, anhydrous dibromoacetic acid, anhydrous tribromoacetic acid, anhydrous monofluoroacetic acid, anhydrous difluoroacetic acid, anhydrous trifluoroacetic acid, anhydrous glutaric acid, anhydrous maleic acid, anhydrous succinic acid, and anhydrous β-bromopropionic acid. These agents may be used in combination of two or more thereof. In terms of cost and ease of handling, anhydrous acetic acid, anhydrous propionic acid, anhydrous butyric acid, and anhydrous isobutyric acid are preferably used. More preferably, anhydrous acetic acid is used.

The fatty acid anhydride is preferably present in an amount of about 1.0 to about 1.2 times equivalent to the phenolic hydroxyl group in the aromatic diols and/or aromatic hydroxycarboxylic acids.

Acylation is preferably performed at about 130° C. to about 180° C. for about 15 minutes to about 20 hours, more preferably at about 140° C. to about 160° C. for about 30 minutes to about 5 hours.

In the present invention, the reagent reacting with the acylated product is an aromatic carboxylic acid. The aromatic carboxylic acid may have one or two or more carboxylic groups, but in terms of good reactivity, it is desirable that the aromatic carboxylic acid have one or two carboxylic groups. When the aromatic carboxylic acid has only one carboxylic group, it is desirable that the aromatic carboxylic acid have a further hydroxyl group. As the aromatic carboxylic acid, an aromatic dicarboxylic acid or an aromatic hydroxycarboxylic acid are particularly preferably used.

Examples of the aromatic dicarboxylic acid may include terephthalic acid, isophthalic acid, 2,6-naphthalene dicarboxylic acid, 1,5-naphthalene dicarboxylic acid, 4,4'-biphenyl dicarboxylic acid, methylterephthalic acid, methylisophthalic acid, diphenylether-4,4'-dicarboxylic acid, diphenylsulfone-4,4'-dicarboxylic acid, diphenylketone-4,4'-dicarboxylic acid, and 2,2'-diphenylpropane-4,4'-dicarboxylic acid. These may be used alone or in combination of two or more thereof.

Among these, terephthalic acid, isophthalic acid or 2,6-naphthalenedicarboxylic acid are preferably used as the aromatic dicarboxylic acid, since they are readily available. In some embodiments, in terms of combining heat resistance and impact resistance with good balance, the aromatic hydroxycarboxylic acid may be present in an amount of at least about 5 mol % or more in the total amount of the acylated product of the compound having phenolic hydroxyl groups and the aromatic carboxylic acid.

In this process, the acylated product of the compound having phenolic hydroxyl groups and the aromatic carboxylic acid may be subjected to transesterification.

In transesterification of the acylated product of the fatty acid anhydride and the aromatic carboxylic acid, since equilibrium is shifted towards production of the product, it is desirable that fatty acids or unreacted fatty acid anhydrides occurring as by-products be distilled off. A part of distilled fatty acids may return to a reactor by reflux, which may also condense or reverse evaporated or sublimated materials accompanied with the fatty acid, thereby returning to the reactor. As such, it is possible for the precipitated carboxylic acid to return to the reactor together with the fatty acids.

Furthermore, the polyester as explained above may be used alone or in combination of two or more thereof.

The low degree condensate may be synthesized by introducing the aforementioned monomers into, for example, a conventional pressurized polymerization bath and then subjecting the same to polycondensation in an aqueous solvent under stirring.

The aqueous solvent refers to any solvent containing water as a main component. Besides water, for example, methanol, ethanol, and the like may be used as a solvent.

Synthesis of the low degree condensate in this process may be usually performed at elevated temperature and pressure under stirring. The polymerization temperature may be controlled after introducing the raw materials. Further, the polymerization pressure may be controlled in accordance with the progress of polymerization.

The reaction temperature and reaction time of the process are suitably set depending on resins to be prepared and are not particularly limited. However, the reaction temperature is preferably about 170° C. to about 400° C. and the reaction time is preferably about 0.5 hours to about 10 hours.

In this process, polycondensation may be performed in a batch mode or in a continuous mode. Further, in terms of preventing the low degree condensate from sticking to a reaction vessel, homogeneous progress of polycondensation, and production of powders and granules of the low degree condensate having a uniform particle diameter, polycondensation to produce the low degree condensate is preferably performed under stirring.

Then, the produced low degree condensate is taken out from the reaction vessel.

If the low degree condensate is a crystalline powder, the low degree condensate is taken out from the reaction vessel under an inert gas atmosphere and atmospheric pressure or less.

The inert gas preferably includes about 1% by volume or less of oxygen so as to prevent oxidative deterioration.

When the low degree condensate is a crystalline powder, the discharge rate of the low degree condensate may be properly adjusted depending on the size of the reaction vessel, the amount of content in the reaction vessel, temperature, size of the opening for discharge, length of a nozzle, and the like.

<Process for Obtaining Granular Compression-Molded Article by Compression Molding Low Degree Condensate>

In this process, the low degree condensate obtained in the above process is subjected to compression molding to produce a granular compression-molded article.

Further, the term "granular compression-molded article" refers to a granular substance obtained by compression molding the low degree condensate. The granular compression-molded article may or may not have a uniform shape. The shape of the granular compression molded article is not particularly limited, but specifically it may have a pellet, sphere, circular column, disk, polygonal column, cubic, rectangular, cylinder or lens shape, and the like.

The granular compression-molded article obtained in this process preferably has a particle diameter of about 0.5 mm to about 30 mm, more preferably about 1.0 mm to about 15 mm, still more preferably about 1.5 mm to about 10 mm. Within this range, problems encountered in the process explained below can be solved and solid phase polymerization can be efficiently carried out. The diameter of the particles may be determined by measuring a long diameter and a short diameter of the granular compression-molded article using a Vernier caliper and calculating the average value.

The process problems associated with fine powder may specifically include occlusion, abrasion, segregation, sticking, aggregation, scattering of dust, flushing, and the like. Occlusion may occur in the course of charging/discharging, storage and transportation; abrasion may occur in the course of transportation and grinding, segregation may occur in the course of storage; sticking and aggregation may occur in the course of transportation, charging/discharging, dust collection and grinding; scattering of dust may occur in the course of dust collection; and flushing may occur in the course of charging/discharging. Specifically, if fine powder is used in the process, the fine powder may be scattered by inert gas in the preparation process of solid phase polymerization, which extends the residence time of fine powder, thereby affecting the color or composition of the polycondensation resin. If there is a large amount of fine powder, the fine powder in solid phase polymerization may function as an adhesive, which can cause adhesion between the low degree condensates, or adhesion of low degree condensates to a reaction vessel for solid phase polymerization. The granular compression-molded article obtained by this process may solve such problems.

The obtained low degree condensate may be subjected to grinding or micro-grinding to a size facilitating molding of the granular molded article prior to compression molding, namely a particle diameter ranging from about 0.01 mm to about 5 mm. Specifically, grinding may be performed using a crusher, such as a hammer crusher and the like. Micro-grinding may include subjecting a material in a molten state to shear treatment, molding the resultant material into a sheet, and cutting the sheet perpendicularly and horizontally in the same manner as pelletizing.

The method for obtaining a granular compression-molded article in this process is not particularly limited so long as the low degree condensate is compression molded to maintain desired physical properties, which are not lost after solid phase polymerization. Specifically, any method used in general granulation may be used. Examples of such methods may include extract granulation, compression granulation and the like. Examples of extract granulation may include a screw method, a roll type cylinder dice method, a roll type disk dice method, and the like. Further, examples of compression granulation may include a compression roll method, a briquetting method, a tableting method, and the like. More specifically, compression molding may be carried out by a compression molding machine selected from the group consisting of a tablet press, an extract roll machine and a briquetting machine. Specific examples of the compression molding machine employed in this process may include a gear pelletizer GCS, a briquetting machine, a compacting machine MS (products of Hosokawa Bipex Corporation), and the like.

The compression pressure upon compression molding is not particularly limited, but is preferably about 10 MPa to about 800 MPa. Within this range, a large amount of fine powder is not provided upon transportation and charging/discharging, and compression molding may be favorably performed without causing melting of the granular compression-molded article owing to friction between the compression molding machine and a granular compression-molded article upon compression molding. The compression pressure is more preferably about 50 MPa to about 500 MPa.

The temperature upon compression molding is not particularly limited.

Further, compression molding may be performed directly after taking out the low degree condensate from the reaction vessel, or after drying the low degree condensate removed from the reaction vessel, or after storing the low degree condensate taken out from the reaction vessel.

<Solid Phase Polymerization>

In this process, the granular compression-molded article of the low degree condensate obtained as above is subjected to high degree polymerization by solid phase polymerization to prepare a polycondensation resin. When high degree polymerization is performed by solid phase polymerization, a polycondensation resin having good thermal stability may be obtained.

The polymerization method and conditions in solid phase polymerization of the low degree condensate are not particularly limited. Any polymerization method and conditions may be employed so long as high degree polymerization can be carried out while maintaining the low degree condensate in a solid state without causing agglomeration, aggregation or degradation of the low degree condensate.

However, in order to prevent oxidative degradation of the low degree condensate and a polycondensation resin, solid phase polymerization is preferably performed under an inert gas atmosphere such as a helium, argon, nitrogen, or carbon dioxide atmosphere and the like, or under reduced pressure.

The temperature for solid phase polymerization is not particularly limited, but the maximum reaction temperature preferably ranges from about 170° C. to about 350° C. Further, this maximum reaction temperature does not need to be a temperature at which solid phase polymerization is completed, and may be reached in the course of solid phase polymerization.

The apparatus for solid phase polymerization employed in this process is not particularly limited and any known apparatus may be used. Examples of the apparatus for solid phase polymerization may include single-shaft disks, kneaders, twin-shaft paddles, a longitudinal tower type apparatus, a longitudinal tower type device, a rotatory drum type or double cone type solid phase polymerization apparatus, drying devices, and the like. In terms of cost and structure of the apparatus, it is desirable to use a longitudinal tower type apparatus or a longitudinal tower type device. In the case of using powder, adhesion to the wall of the device and clogging of the pipe can be encountered, and thus a longitudinal tower type apparatus or a longitudinal tower type device, which has difficulty being used in continuous production under reduced pressure in the art, may be used as an apparatus for solid phase polymerization in the continuous process of the present invention. The use of the longitudinal tower type apparatus or the longitudinal tower type device is also preferable in terms of industrial productivity or quality, such as reduction of residual monomers or oligomers.

The reaction time for solid phase polymerization is not particularly limited, but is usually about 1 hour to about 20 hours. During solid phase polymerization, the low degree condensates may be mechanically stirred or stirred by gas stream.

In the present invention, in the process of preparing the low degree condensate, in the process of solid phase polymerization, or in an optional stage after solid phase polymerization, as needed, various fiber materials such as glass fibers, carbon fibers, and the like, additives such as inorganic fillers, organic fillers, coloring agents, UV absorbers, light stabilizers, antioxidants, antistatic agents, flame retardants, crystallization accelerators, plasticizers, lubricants, other polymers, and the like may be added.

The polycondensation resin obtained by the method of the present invention has excellent physical properties in terms of heat resistance, mechanical properties, low water absorption, chemical resistance, and the like. Thus, by utilizing these properties, the polycondensation resin, alone or in the form of a composition containing various additives or other polymers as needed, may be molded into various molded articles and fibers through various molding methods or spinning methods conventionally applied to the polycondensation resin, for example, molding or melt spinning, such as injection molding, blow molding, extrusion molding, compression molding, stretching, vacuum molding, and the like. Thus obtained molded articles or fibers may be effectively used in engineering plastics and various other applications including domestic appliances and industrial materials, such as electronic and electric components, automobile components, office automation components, and the like.

Second Embodiment

According to the second embodiment, a polycondensation resin may be prepared by a method including: preparing a crystalline powder of a low degree condensate; mixing the crystalline powder of the low degree condensate and a granular molded article of a thermoplastic resin; and solid phase polymerizing the mixture of the low degree condensate and the granular molded article of the thermoplastic resin.

<Process for Preparing Crystalline Powder of Low Degree Condensate>

The process for preparing a crystalline powder of the low degree condensate may be performed in the same manner as in the first embodiment for preparing a low degree condensate.

<Process for Mixing a Granular Molded Article of Thermoplastic Resin>

In this process, the crystalline powder of the low degree condensate obtained above is mixed with a granular molded article of a thermoplastic resin. The granular molded article of the thermoplastic resin refers to a granular molded article obtained by compression or extrusion molding the thermoplastic resin.

Examples of the thermoplastic resin may include polyolefin resins, such as polyethylene, polypropylene, and the like, styrene resin, acrylic resin, polyurethane, chlorinated polyethylene, chlorinated polypropylene, aromatic polyketone, aliphatic polyketone, fluorine resin, polyphenylene sulfide, polyetherketone, polyimide, thermoplastic starch resin, AS resin, ABS resin, AES resin, ACS resin, polyvinyl chloride resin, polyvinylidene chloride, vinyl ester resin, MS resin, polycarbonate, polyarylate, polysulfone, polyethersulfone, phenoxy resin, polyphenylene oxide, poly-4-methylpentene-1, polyetherimide, polyvinyl alcohol, aliphatic polyester, aromatic polyester, polyamide, polyacetal, and the like. These may be used alone or in combination of two or more thereof. Furthermore, the granular molded article of the thermoplastic resin may be commercially obtained or synthesized.

The granular molded article of the thermoplastic resin used in this process may be the same resin as in the low degree condensate or different from that of the low degree condensate. In terms of quality of the final polycondensation resin, granular molded article of thermoplastic resin is preferably the same kind of resin as in the low degree condensate. Even if different resins are employed, finally obtained polycondensation resins may be in the form of a polymer blend, which is capable of being used as a polymer alloy or a material for a polymer alloy. If there is a difference in terms of particle diameter and specific gravity, the low degree condensate and the granular molded article of the thermoplastic resin may be separated by sieving, centrifugation, and the like.

The granular molded article of the thermoplastic resin may have an inherent viscosity of about 0.3 dl/g to about 5 dl/g as measured at a concentration of 0.5 g/dl. If the inherent viscosity is less than 0.3 dl/g, the effects of the present invention cannot be obtained since the granular molded article can be fused, thereby causing scaling of pipes. Meanwhile, if the inherent viscosity is greater than 5 dl/g, agglomeration of the resin can be inhibited. However, owing to a big difference in viscosity, even a slight inclusion into a product can lead to product defects due to an un-melted material and the like.

With a granular molded article of a thermoplastic resin having the inherent viscosity as defined above, the effect of the present invention can be accomplished. However, in terms of quality of the polycondensation resin to be finally obtained, the inherent viscosity of the granular molded article of the thermoplastic resin is preferably closer to the inherent viscosity of the polycondensation resin to be finally obtained. Specifically, the inherent viscosity of the granular molded article of the thermoplastic resin preferably falls within the range of about ±30% of the inherent viscosity of the polycondensation resin to be finally obtained, more preferably within the range of about ±20%, for example, within the range of about ±10%.

Further, the inherent viscosity may be measured by the method disclosed in the examples.

The thermoplastic resin is preferably end capped with an end capping agent so as to stabilize viscosity in solid phase polymerization. In addition to the compounds listed in the description of polyamides, examples of the end capping agent may include monoalcohols such as methanol, ethanol, isopropanol, n-butanol, 2-ethylhexanol, 1-octanol, benzylalcohol, polyethyleneglycol monomethylether, polypropyleneglycol monomethylether, and the like; monoisocyanates such as phenyl isocyanate, benzyl isocyanate, phenethyl isocyanate, 4,4'-diphenylmethylene isocyanate, naphthalene isocyanate, hexylphenyl isocyanate, heptylphenyl isocyanate, octylphenyl isocyanate, nonylphenyl isocyanate, decylphenyl isocyanate, undecylphenyl isocyanate, dodecylphenyl isocyanate, and the like; acid anhydrides such as anhydrous phthalic acid, 2,3-benzophenonedicarboxylic acid anhydride, 3,4-benzophenonedicarboxylic acid anhydride, 2,3-dicarboxyphenylphenylether anhydride, 3,4-dicarboxyphenylphenylether anhydride, 2,3-biphenyldicarboxylic acid anhydride, 3,4-biphenyldicarboxylic acid anhydride, 2,3-dicarboxyphenylphenylsulfone anhydride, 3,4-dicarboxyphenylphenylsulfone anhydride, 2,3-dicarboxyphenylphenylsulfide anhydride, 3,4-dicarboxyphenylphenylsulfide anhydride, 1,2-naphthalenedicarboxylic acid anhydride, 2,3-naphthalenedicarboxylic acid anhydride, 1,8-naphthalenedicarboxylic acid anhydride, 1,2-anthracenedicarboxylic acid anhydride, 2,3-anthracenedicarboxylic acid anhydride, 1,9-anthracenedicarboxylic acid anhydride, and the like.

The shape of the granular molded article is not particularly limited. Specifically, any of pellet, sphere, circular column, disk, polygonal column, cubic, rectangular, cylinder, and lens shapes may be used. The molded article may have or may not have a uniform shape. Further, the diameter of the particles of the granular molded article is not particularly limited, but preferably ranges from about 1 mm to about 10 mm. The particle diameter of the granular molded article may be determined by measuring the diameter of more than 10 granular molded articles using Vernier calipers and calculating the average. When the granular molded article has an asymmetrical or irregular shape, the particle diameter of the granular molded article may be measured at 2 points or more in a certain direction.

The granular molded article is mixed in an amount of preferably about 0.1 wt % to about 10 wt %, more preferably about 1 wt % to about 10 wt %, with respect to crystalline powder of the low degree condensate. Within this range, a high quality polycondensation resin can be obtained.

The method for mixing the granular molded article is not particularly limited. Examples of the mixing method may include a method of directly adding the granular molded article to a solid phase polymerization apparatus explained below, and a method of pre-mixing in a mixing apparatus and then filling a solid phase polymerization apparatus with the mix.

<Solid Phase Polymerization>

In this process, the granular molded article of the low degree condensate obtained as above is subjected to a high degree of polymerization by solid phase polymerization to prepare a polycondensation resin. When high degree polymerization is performed through solid phase polymerization, a polycondensation resin suffering from less thermal deterioration may be obtained.

The polymerization method and condition during solid phase polymerization of the low degree condensate are not particularly limited. Any polymerization methods and conditions may be employed so long as the high degree of polymerization is capable of being carried out while maintaining the low degree condensate in a solid state without causing any agglomeration, aggregation and deterioration of the low degree condensate.

However, in order to prevent oxidative deterioration of the low degree condensate and the polycondensation resin, solid phase polymerization is preferably performed under an inert gas atmosphere or under reduced pressure, as defined in the solid phase polymerization of the first embodiment.

The temperature and reaction time for solid phase polymerization may be the same as those mentioned in the first embodiment.

An apparatus for solid phase polymerization employed in this process is not particularly limited, but any known apparatus may be used. Examples of the apparatus for solid phase polymerization may include kneaders, twin-shaft paddles, a tower type, rotatory drum type, or double cone type solid phase polymerization apparatus, a longitudinal tower type dryer, and the like.

In the present invention, in the process of preparing the low degree condensate, in the process of solid phase polymerization or in an optional stage after solid phase polymerization, as needed, various fiber materials such as glass fibers, carbon fibers, and the like, additives such as inorganic fillers, organic fillers, coloring agents, UV absorbers, light stabilizers, antioxidants, antistatic agents, flame retardants, crystallization accelerators, plasticizers, lubricants, other polymers, and the like may be added.

The polycondensation resin obtained by the method of the present invention has excellent physical properties in terms of heat resistance, mechanical properties, low water absorption, chemical resistance, and the like. Thus, by utilizing these properties, the polycondensation resin, alone or in the form of a composition containing various additives or other polymers as needed, may be molded into various molded articles and fibers through various molding methods or spinning methods conventionally applied to the polycondensation resin, for example, molding or melt spinning, such as injection molding, blow molding, extrusion molding, compression molding, stretching, vacuum molding, and the like.

Thus obtained molded articles or fibers may be effectively used in engineering plastics and various other applications including domestic appliances and industrial materials, such as electronic and electric components, automobile components, office automation components, and the like.

Third Embodiment

According to the third embodiment, the low degree condensate may be prepared by polycondensation of a dicarboxylic acid and a diamine, wherein the moisture content in a reaction system at completion of the reaction ranges from about 15 wt % to about 35 wt %.

For example, the method includes preparing a low degree condensate by polycondensation of a dicarboxylic acid and a diamine; discharging and cooling the low degree condensate under an inert gas atmosphere and atmospheric pressure or less; and subjecting the low degree condensate to solid phase polymerization, wherein the moisture content in a reaction system at the time of completion of the reaction ranges from about 15 wt % to about 35 wt % in the preparation of the low degree condensate.

According to the third embodiment, it is possible to obtain a low degree condensate having a molecular weight not causing agglomeration during solid phase polymerization. Further, it is also possible to take out the low degree condensate using a simple method without using any complex operation such as supply of steam and the like.

<Process for Preparing Low Degree Condensate>

The process of preparing a low degree condensate may be carried out in the same manner as in the process for preparing a low degree condensate of the polyamide in the first embodiment.

<Process for Discharging and Cooling the Low Degree Condensate>

Then, the low degree condensate obtained above is taken out from the reaction vessel. Taking out the low degree condensate from the reaction vessel is performed at a reaction system temperature ranging from about 230° C. to about 250° C. The low degree condensate may be taken out from the reaction vessel under an inert gas atmosphere and atmospheric pressure or less when the moisture content in a reaction system at the completion of the reaction is about 15 wt % to about 35 wt %, preferably about 20 wt % to about 33 wt %. According to the discharging method of this invention, since taking the low degree condensate does not require a pressure vessel having a controlled specific pressure and separate provision of steam into a reaction vessel, one can obtain the low degree condensate through a simple and effective manner in the form of non-foam powder or granules exhibiting lower thermal deterioration, sufficiently high inherent viscosity and high bulk density.

The inert gas atmosphere preferably has an oxygen concentration of about 1% by volume or less in order to inhibit oxidative degradation of the low degree condensate.

The discharge rate of the low degree condensate may be properly adjusted depending on the size of the reaction vessel, the amount of content in the reaction vessel, temperature, size of the opening for discharge, length of a nozzle, and the like. However, in general, it is desirable that discharge is performed such that the discharge rate per cross-section area of a discharge opening ranges from about 2000 kg/s/m$^2$ to about 20000 kg/s/m$^2$. Within this range, since the volume density of the low degree condensate is preferably about 0.35 g/cc to about 0.8 g/cc, collapse, aggregation, and agglomeration to a reactor wall may not occur during solid phase polymerization, the handling properties are good and a polymerization apparatus may be filled with a large amount of the low degree condensate, thereby improving volume efficiency of the apparatus employed in solid phase polymerization. The volume density may be measured by the method explained in examples below.

Further, the low degree condensate discharged from the reaction vessel exhibits almost no thermal or oxidative degradation since the temperature of the low degree condensate is advantageously decreased to about 100° C. or less due to latent heat of vaporization when discharged.

Furthermore, the low degree condensates discharged from the reaction vessel allows vaporization of most moisture therefrom due to heat accumulated therein, thereby enabling cooling and drying of the low degree condensates to be performed at the same time. Discharge under an inert gas atmosphere such as nitrogen and the like or under reduced pressure lower than atmospheric pressure is preferable since efficiency of drying and cooling can be improved. In addition, efficiency of drying and cooling may also be improved by installing a cyclone type solid-gas separation apparatus as a container for discharging, thereby preventing scattering of powder upon discharging while allowing discharge under high linear gas velocity.

The low degree condensate obtained above may have sufficiently high inherent viscosity and low residual amount of unreacted materials, and thus be subjected to solid phase polymerization at high temperature without causing agglomeration or aggregation of the particles of the low degree condensate upon high degree polymerization through solid phase polymerization. Further, there is little deterioration due to side reaction.

If necessary, the low degree condensate obtained above may be subjected to compaction or crude milling in order to enhance bulk density of the low degree condensate or to adjust the particle diameter.

<Solid Phase Polymerization>

In this process, the low degree condensate discharged from the reaction vessel is subjected to high degree polymerization through solid phase polymerization to prepare a polyamide. The solid phase reaction may be performed subsequent to discharge of the low degree condensate from the reaction vessel, or may be performed after drying the low degree condensate discharged from the reaction vessel, or may be performed after storing the low degree condensate discharged from the reaction vessel, or may be performed after subjecting the low degree condensate discharged from the reaction vessel to compaction or granulation. When the low degree condensate is subjected to high degree polymerization through solid phase polymerization, one can obtain a polyamide having little thermal deterioration.

The polymerization method and conditions during solid phase polymerization are not particularly limited. Any polymerization methods and conditions may be employed so long as the high degree polymerization can be carried out while maintaining the low degree condensate in a solid state without causing agglomeration, aggregation or degradation of the low degree condensate.

However, in order to prevent oxidative deterioration of the low degree condensate and the polycondensation resin, the solid phase polymerization is preferably performed under an inert gas atmosphere, such as helium gas, argon gas, nitrogen gas, carbonate gas, and the like, or under reduced pressure.

The temperature for solid phase polymerization is not particularly limited, but the maximum reaction temperature preferably ranges from about 170° C. to about 260° C., more preferably about 200° C. to about 250° C., still more preferably about 220° C. to about 240° C. According to the present invention, solid phase polymerization may be performed at a lower temperature than in the art, namely the solid phase polymerization may be performed under milder conditions. Further, this maximum reaction temperature does not need to be a temperature at which solid phase polymerization is completed, and may be reached in the course of solid phase polymerization.

The apparatus for solid phase polymerization employed in this process is not particularly limited and any known apparatus may be used. Examples of the apparatus for solid phase polymerization may include single-shaft disks, kneaders, twin-shaft paddles, a longitudinal tower type apparatus, a longitudinal tower type device, a rotatory drum type or double cone type solid phase polymerization apparatus, drying devices, and the like.

The reaction time for solid phase polymerization is not particularly limited, but is usually about 1 hour to about 20 hours. During solid phase polymerization, the low degree condensates may be mechanically stirred or stirred by gas stream.

In the present invention, in the process of preparing the low degree condensate, in the process of solid phase polymerization, or in an optional stage after solid phase polymerization, as needed, various fiber materials such as glass fibers, carbon fibers, and the like, additives such as inorganic fillers, organic fillers, coloring agents, UV absorbers, light stabilizers, antioxidants, antistatic agents, flame retardants, crystallization accelerators, plasticizers, lubricants, other polymers, and the like may be added.

The polyamide obtained by the method of the present invention has excellent physical properties in terms of heat resistance, mechanical properties, low water absorption, chemical resistance, and the like. Thus, by utilizing these properties, the polyamide, alone or in the form of a composition containing various additives or other polymers as needed, may be molded into various molded articles and fibers through various molding or spinning methods conventionally applied to the polyamide, for example, injection molding, blow molding, extrusion molding, compression molding, stretching, vacuum molding, and the like. Thus obtained molded articles or fibers may be effectively used in engineering plastics and various other applications including domestic appliances and industrial materials, such as electronic and electric components, automobile components, office automation components, and the like.

EXAMPLES

The present invention will be explained in more detail with reference to the following examples and comparative examples. These examples are provided for illustration only and are not to be in any way construed as limiting the present invention.

First Embodiment: Examples 1~6 and Comparative Examples 1~6

Example 1

Preparation Example of Polyamide

To a 1 liter autoclave reactor equipped with a partial condenser, a pressure control valve, an observation window and a bottom discharge valve, 83.8 g (0.504 mol) of terephthalic acid, 88.2 g (0.512 mol) of 1,10-decane diamine, 0.75 g (0.012 mol, corresponding to 2 mol % with respect to dicarboxylic acid) of acetic acid as an end capping agent, 0.172 g (0.1 parts by weight based on charged materials) of sodium hypophosphite monohydrate as a catalyst and 115 g (40 wt % based on charged materials) of water as raw materials were introduced and purged with nitrogen. The temperature was raised to 180° C. over 0.5 hours under stirring and maintained for 0.5 hours, thereby obtaining a homogeneous solution. Then, the inner temperature was raised to 245° C. and maintained over 1 hour. After the inner pressure reached 3.0 MPa, reaction was continued for 2 hours while distilling off water in order to maintain the same pressure.

After a certain period of reaction time, the produced low degree condensate was discharged from a bottom discharge valve at room temperature (25° C.) under nitrogen atmosphere and atmospheric pressure to a cyclone container while maintaining the temperature of the reaction bath and the moisture content (32 wt %) in a reaction system. The nozzle diameter of the discharge valve was 3 mm and discharge was performed for about 10 seconds. The oxygen concentration in the discharge container was about 0.1% by volume and the low degree condensate was obtained in powder form.

The low degree condensate of the polyamide obtained had an inherent viscosity of 0.16 dl/g and Tm of 310° C.

Subsequently, the low degree condensate in powder form was supplied into a tablet molding machine by applying a pressure of 300 MPa to obtain a granular compression-molded article of the low degree condensate having a diameter of 4 mm. 40 g of the granular compression-molded article was supplied into a 500 ml rotary evaporator and subjected to solid phase polymerization at 250° C. and 30 rpm under a vacuum of 0.13 kPa for 3 hours.

The obtained polyamide had an inherent viscosity (IV) of 0.85 dl/g. Powder adhesion to a reactor wall was not observed and there was no stickiness due to resin agglomeration. Further, powder adhesion to a vacuum vent line was not observed.

Comparative Example 1

A polyamide was prepared in the same manner as in Example 1 except that a granular compression-molded article was not prepared and the low degree condensate in powder form was directly subjected to solid phase polymerization.

The obtained polyamide had an inherent viscosity (IV) of 0.75 dl/g. Powder adhesion to a reactor wall was not observed and there was no stickiness due to resin agglomeration. However, powder adhesion to a vacuum vent line was observed.

Example 2

Preparation Example of Polyamide

A polyamide was prepared in the same manner as in Example 1 except that 100 g of the granular compression-molded article was supplied into a glass cylinder having a diameter of 5 cm and a length of 25 cm, and then subjected to solid phase polymerization at 250° C. under a vacuum of 0.13 kPa for 3 hours.

The obtained polyamide had an inherent viscosity (IV) of 0.80 dl/g. Powder adhesion to a reactor wall was not observed and there was no stickiness due to resin agglomeration. Further, powder adhesion to a vacuum vent line was not observed.

Comparative Example 2

A polyamide was prepared in the same manner as in Example 2 except that a granular compression-molded article was not prepared and the low degree condensate in powder form was directly subjected to solid phase polymerization.

The obtained polyamide had an inherent viscosity (IV) of 0.65 dl/g. Powder adhesion to a reactor wall was minimal and there was no stickiness due to resin agglomeration. However, powder adhesion to a vacuum vent line was observed.

Example 3

Preparation Example of Polyamide

To a 1 liter autoclave reactor equipped with a partial condenser, a pressure control valve, an observation window and a bottom discharge valve, 83.8 g (0.504 mol) of terephthalic acid, 88.2 g (0.512 mol) of 1,10-decane diamine, 0.75 g (0.012 mol, 2 mol % with respect to dicarboxylic acid) of acetic acid as an end capping agent, 0.172 g (0.1 parts by weight based on charged materials) of sodium hypophosphite monohydrate as a catalyst and 115 g (40 wt % based on charged materials) of water as raw materials were introduced and purged with nitrogen. The temperature was raised to 180° C. over 0.5 hour under stirring and maintained for 0.5 hour, thereby obtaining a homogeneous solution. Then, the inner temperature was raised to 220° C. and maintained over 1 hour. After the inner pressure reached 2.2 MPa, reaction was continued for 2 hours while distilling off water in order to maintain the same pressure.

After a certain reaction time, the produced low degree condensate was discharged from a bottom discharge valve at room temperature (25° C.) under nitrogen atmosphere and atmospheric pressure to a cyclone container while maintaining the temperature of the reaction bath and the moisture content (32 wt %) in a reaction system. The nozzle diameter of the discharge valve was 3 mm and discharge was performed for about 10 seconds. The oxygen concentration in the discharge container was about 0.1% by volume and a white powder of a low degree condensate was obtained.

The obtained low degree condensate of the polyamide had an inherent viscosity of 0.06 dl/g and Tm of 310° C.

Subsequently, the low degree condensate in powder form was supplied into a tablet molding machine by applying a pressure of 300 MPa to obtain a granular compression-molded article of the low degree condensate having a diameter of 4 mm.

100 g of the granular compression-molded article was supplied into a glass cylinder having a diameter of 5 cm and a length of 25 cm and subjected to solid phase polymerization at 250° C. under a vacuum of 0.13 kPa for 3 hours.

The obtained polyamide had an inherent viscosity (IV) of 0.78 dl/g. Powder adhesion to a reactor wall was not observed at all and there was no stickiness due to resin agglomeration. Further, powder adhesion to a vacuum vent line was not observed.

Comparative Example 3

A polyamide was prepared in the same manner as in Example 3 except that a granular compression-molded article was not prepared and the low degree condensate in powder form was directly subjected to solid phase polymerization.

The obtained polyamide had an inherent viscosity (IV) of 0.61 dl/g. Powder adhesion to a reactor wall was observed and there was stickiness due to resin agglomeration. Further, powder adhesion to a vacuum vent line was observed.

Example 4

Preparation Example of Polycarbonate

To an agitation vessel of a polymerization reactor equipped with a condenser and a pressure reducing device, 228 g (1 mol) of 2,2-bis(4-hydroxyphenyl)propane, 223 g (1.04 mol) of diphenyl carbonate and 0.056 mg of potassium hydroxide were introduced and reacted at a temperature of 240° C., and a reaction pressure of 1.3 kPa (10 torr) for 2 hours while discharging a reaction by-product, phenol, from the agitation vessel. After cooling to room temperature (25° C.), the low degree condensate of the polycarbonate was taken out from the agitation vessel. The low degree condensate was crushed, stirred in acetone, crystallized, filtered, and dried at 100° C. under reduced pressure to obtain a low degree condensate of the polycarbonate in powder form.

The obtained low degree condensate of the polycarbonate had an inherent viscosity of 0.16 dl/g, and Tm of 226° C.

Subsequently, the low degree condensate in powder form was supplied into a tablet molding machine by applying a pressure of 300 MPa to obtain a granular compression-molded article of the low degree condensate having a diameter of 4 mm.

40 g of the granular compression-molded article was supplied into a 500 ml rotary evaporator and subjected to solid phase polymerization at 220° C. and 30 rpm under a vacuum of 0.13 kPa for 3 hours.

The obtained polycarbonate had an inherent viscosity (IV) of 0.56 dl/g. Powder adhesion to a reactor wall was not observed and there was no stickiness due to resin agglomeration. Further, powder adhesion to a vacuum vent line was not observed.

Comparative Example 4

A polycarbonate was prepared in the same manner as in Example 4 except that a granular compression-molded article was not prepared and the low degree condensate in powder form was directly subjected to solid phase polymerization.

The obtained polycarbonate had an inherent viscosity (IV) of 0.55 dl/g. Powder adhesion to a reactor wall was observed and there was stickiness due to resin agglomeration. Further, powder adhesion to a vacuum vent line was observed.

Example 5

Preparation Example of Polycarbonate

A polycarbonate was prepared in the same manner as in Example 4 except that 100 g of a granular compression-molded article was supplied into a glass cylinder having a diameter of 5 cm and a length of 25 cm and subjected to solid phase polymerization at 220° C. under a vacuum of 0.13 kPa for 3 hours.

The obtained polycarbonate had an inherent viscosity (IV) of 0.53 dl/g. Powder adhesion to a reactor wall was not observed and there was no stickiness due to resin agglomeration. Further, powder adhesion to a vacuum vent line was not observed.

Comparative Example 5

A polycarbonate was prepared in the same manner as in Example 5 except that a granular compression-molded article was not prepared and the low degree condensate in powder form was directly subjected to solid phase polymerization.

The obtained polycarbonate had an inherent viscosity (IV) of 0.48 dl/g. Powder adhesion to a reactor wall was observed and there was stickiness due to resin agglomeration. Further, powder adhesion to a vacuum vent line was observed.

Example 6

Preparation Example of Polyester

To an agitation vessel in a polymerization reactor equipped with a condenser, 207.0 g (1.5 mol) of parahydroxybenzoic acid, 19.9 g (0.11 mol) of biphenol, 43.3 g (0.21 mol) of 4,4'-dihydroxydiphenylether, 53.4 g (0.32 mol) of terephthalic acid and 229.5 g (2.25 mol) of anhydrous acetic acid were introduced and maintained at 140° C. under stirring for 5 hours. Then, the resultant was warmed to 170° C. while distilling off excess anhydrous acetic acid and by-produced acetic acid, under nitrogen stream. The temperature was maintained for one hour, warmed to 350° C. over four hours and then reacted at this temperature for 30 minutes. After cooling to room temperature (25° C.), the low degree condensate of the polyester was taken out from the agitation vessel and then crushed in a crusher to obtain a low degree condensate of the polyester in powder form.

The obtained low degree condensate of the polyester had an inherent viscosity of 1.10 dl/g, and Tm of 320° C.

Subsequently, the low degree condensate of the polyester in powder form was supplied into a tablet molding machine by applying a pressure of 300 MPa to obtain a granular compression-molded article of the low degree condensate of the polyester having a diameter of 4 mm.

100 g of the granular compression-molded article was supplied into a glass cylinder having a diameter of 5 cm and a length of 25 cm, left and subjected to solid phase polymerization at 280° C. under a vacuum of 0.13 kPa for 3 hours.

The obtained polyester had an inherent viscosity (IV) of 3.02 dl/g. Powder adhesion to a reactor wall was not observed and there was no stickiness due to resin agglomeration. Further, powder adhesion to a vacuum vent line was not observed.

Comparative Example 6

A polyester was prepared in the same manner as in Example 6 except that a granular compression-molded article was not prepared and the low degree condensate in powder form was directly subjected to solid phase polymerization.

The obtained polyester had an inherent viscosity (IV) of 2.73 dl/g. Powder adhesion to a reactor wall was observed, but there was no stickiness due to resin agglomeration. Further, powder adhesion to a vacuum vent line was observed.

Results of the examples and the comparative examples are summarized in Table 1.

inherent viscosity of the polycarbonate was measured at 20° C. in dichlormethane as a solvent, and inherent viscosity of the polyester was measured at 60° C. in pentafluorophenol as a solvent.

<Measurement of Melting Point Tm (° C.)>

The melting point was determined by measuring an endothermic peak by melting at a flow rate of 10 Ml/min and a temperature increasing rate of 10° C./min under nitrogen atmosphere in DSC available from Seiko Instrument Co., Ltd.

Second Embodiment: Examples 7~10 and Comparative Examples 7~10

Example 7

Preparation Example of Polyamide

To a 1 liter autoclave reactor equipped with a partial condenser, a pressure control valve, an observation window and a bottom discharge valve, 83.8 g (0.504 mol) of terephthalic acid, 88.2 g (0.512 mol) of 1,10-decane diamine, 0.75 g (0.012 mol, corresponding to 2 mol % with respect to dicarboxylic acid) of acetic acid as an end capping agent, 0.172 g (0.1 parts by weight based on charged materials) of sodium hypophosphite monohydrate as a catalyst and 115 g (40 wt % based on charged materials) of water as raw materials were introduced and purged with nitrogen. The temperature was raised to 180° C. over 0.5 hours under stirring and maintained for 0.5 hours, thereby obtaining a homogeneous solution. Then, the inner temperature was raised to 245° C. and maintained for 1 hour. After the inner pressure reached 3.0 MPa, reaction was continued for 2 hours while distilling off water in order to maintain the same pressure.

After a certain period of reaction time, the produced low degree condensate was discharged from a bottom discharge valve at room temperature (25° C.) under nitrogen atmosphere and atmospheric pressure to a cyclone container while maintaining the temperature of the reaction bath and the moisture content (32 wt %) in a reaction system. The nozzle

TABLE 1

| | Kind of polymer | Compression molding | IV of Low degree condensate (dl/g) | IV After solid phase polymerization (dl/g) | Solid phase polymerization apparatus | Powder adhesion | Resin agglomeration | Clogging of vacuum vent line |
|---|---|---|---|---|---|---|---|---|
| Example 1 | Polyamide | Yes | 0.16 | 0.85 | rotary evaporator | very slight | No | No |
| Comparative Example 1 | Polyamide | No | 0.16 | 0.75 | rotary evaporator | very slight | No | Yes |
| Example 2 | Polyamide | Yes | 0.16 | 0.80 | tower type | No | No | No |
| Comparative Example 2 | Polyamide | No | 0.16 | 0.65 | tower type | Slight | No | Yes |
| Example 3 | Polyamide | Yes | 0.06 | 0.78 | tower type | No | No | No |
| Comparative Example 3 | Polyamide | No | 0.06 | 0.61 | tower type | Large amount | Yes | Yes |
| Example 4 | Polycarbonate | Yes | 0.16 | 0.56 | rotary evaporator | very slight | No | No |
| Comparative Example 4 | polycarbonate | No | 0.16 | 0.55 | rotary evaporator | Large amount | Yes | Yes |
| Example 5 | polycarbonate | Yes | 0.16 | 0.53 | tower type | No | No | No |
| Comparative Example 5 | polycarbonate | No | 0.16 | 0.48 | tower type | Large amount | Yes | Yes |
| Example 6 | polyester | Yes | 1.10 | 3.02 | tower type | No | No | No |
| Comparative Example 6 | polyester | No | 1.10 | 2.73 | tower type | Large amount | No | Yes |

<Measurement of Inherent Viscosity IV (dl/g)>

In measurement of inherent viscosity, an Ubbelohde viscometer was used. Inherent viscosity of the polyamide was measured at 25° C. in concentrated sulfuric acid as a solvent, diameter of the discharge valve was 3 mm and discharge was performed for about 10 seconds. The oxygen concentration in the discharge container was about 0.1% by volume and the low degree condensate was obtained in powder form.

The low degree condensate of the polyamide obtained had an inherent viscosity of 0.16 dl/g and Tm of 310° C.

Subsequently, 2 g of pellets (average diameter: 3 mm, average length: 4 mm) obtained by compression molding the polyamide having inherent viscosity of 0.75 dl/g and 40 g of the powder of the low degree condensate of the polyamide obtained were supplied into a 500 ml glass rotary evaporator and subjected to solid phase polymerization at 250° C. and 30 rpm under a vacuum of 0.13 kPa for 3 hours.

The obtained polyamide had an inherent viscosity (IV) of 0.83 dl/g. Powder adhesion to a reactor wall was not observed and there was no stickiness due to resin agglomeration.

Comparative Example 7

A polyamide was prepared in the same manner as in Example 1 except that pellets were not added, but the low degree condensate in powder form was directly subjected to solid phase polymerization.

The obtained polyamide had an inherent viscosity (IV) of 0.75 dl/g. There was no agglomeration of resin, but slight adhesion of powder to a reactor wall was observed.

Example 8

Preparation Example of Polyamide

To a 1 liter autoclave reactor equipped with a partial condenser, a pressure control valve, an observation window and a bottom discharge valve, 83.8 g (0.504 mol) of terephthalic acid, 88.2 g (0.512 mol) of 1,10-decane diamine, 0.75 g (0.012 mol, corresponding to 2 mol % with respect to dicarboxylic acid) of acetic acid as an end capping agent, 0.172 g (0.1 parts by weight based on charged materials) of sodium hypophosphite monohydrate as a catalyst and 115 g (40 wt % based on charged materials) of water as raw materials were introduced and purged with nitrogen. The temperature was raised to 180° C. over 0.5 hours under stirring and maintained for 0.5 hours, thereby obtaining a homogeneous solution. Then, the inner temperature was raised to 220° C. and maintained for 1 hour. After the inner pressure reached 2.2 MPa, reaction was continued for 2 hours while distilling off water in order to maintain the same pressure.

After a certain period of reaction time, the produced low degree condensate was discharged from a bottom discharge valve at room temperature (25° C.) under nitrogen atmosphere and atmospheric pressure to a cyclone container while maintaining the temperature of the reaction bath and the moisture content (32 wt %) in a reaction system. The nozzle diameter of the discharge valve was 3 mm and discharge was performed for about 10 seconds. The oxygen concentration in the discharge container was about 0.1% by volume and a white powder of a low degree condensate was obtained.

The low degree condensate of the polyamide obtained had an inherent viscosity of 0.06 dl/g and Tm of 310° C.

Subsequently, 2 g of pellets (average diameter: 3 mm, average length: 4 mm) prepared in advance by compression molding the polyamide having inherent viscosity of 0.75 dl/g and 40 g of the powder of the low degree condensate of the polyamide obtained were supplied into to a 500 ml rotary evaporator and subjected to solid phase polymerization at 250° C. and 30 rpm under a vacuum of 0.13 kPa for 3 hours.

The obtained polyamide had an inherent viscosity (IV) of 0.78 dl/g. Powder adhesion to a reactor wall was not observed at all and there was almost no stickiness due to resin agglomeration.

Comparative Example 8

A polyamide was prepared in the same manner as in Example 2 except that pellets were not added, but the low degree condensate in powder form was directly subjected to solid phase polymerization.

The obtained polyamide had an inherent viscosity (IV) of 0.71 dl/g. Powder adhesion to a reactor wall was observed, and there was stickiness due to resin agglomeration.

Example 9

Preparation Example of Polycarbonate

To an agitation vessel in a polymerization reactor equipped with a condenser, and a pressure reducing apparatus, 228 g (1 mol) of 2,2-bis(4-hydroxyphenyl)propane, 223 g (1.04 mol) of diphenyl carbonate and 0.056 mg of potassium hydroxide were introduced and reacted at a temperature of 240° C., and a reaction pressure of 1.3 kPa (10 torr) for 2 hours while discharging a reaction by-product, phenol, from the agitation vessel. After cooling to room temperature (25° C.), the low degree condensate of the polycarbonate was taken out from the agitation vessel. The low degree condensate was crushed, stirred in acetone, crystallized, filtered, and dried at 100° C. under reduced pressure to obtain a low degree condensate of the polycarbonate in powder form.

The obtained low degree condensate of the polycarbonate had an inherent viscosity of 0.16 dl/g, and Tm of 226° C.

Subsequently, 2 g of pellets (average diameter: 3 mm, average length: 4 mm) prepared in advance by compression molding the polycarbonate having inherent viscosity of 0.50 dl/g and 40 g of the powder of low degree condensate of the polycarbonate obtained were supplied into to a 500 ml rotary evaporator and subjected to solid phase polymerization at 220° C. and 30 rpm under a vacuum of 0.13 kPa for 2.5 hours.

The obtained polycarbonate had an inherent viscosity (IV) of 0.50 dl/g. Powder adhesion to a reactor wall was not observed at all and there was no stickiness due to resin agglomeration.

Comparative Example 9

A polycarbonate was prepared in the same manner as in Example 3 except that pellets were not added, but the low degree condensate in powder form was directly subjected to solid phase polymerization.

The obtained polycarbonate had an inherent viscosity (IV) of 0.46 dl/g. Powder adhesion to a reactor wall was observed and there was no stickiness due to resin agglomeration.

Example 10

Preparative Example of Polyester

To an agitation vessel in a polymerization reactor equipped with an agitation vessel and a condenser, 207.0 g (1.5 mol) of parahydroxybenzoic acid, 19.9 g (0.11 mol) of biphenol, 43.3 g (0.21 mol) of 4,4'-dihydroxydiphenylether, 53.4 g (0.32 mol) of terephthalic acid and 229.5 g (2.25 mol) of anhydrous acetic acid were introduced and maintained at 140° C. under stirring for 5 hours. Then, the content was warmed to 170° C. while distilling off excess anhydrous acetic acid and by-produced acetic acid, under nitrogen stream. The temperature was maintained for one hour, warmed to 350° C. over 4 hours and then reacted at this temperature for 30 minutes. After cooling to room temperature (25° C.), the low degree condensate of the polyester was taken out from the agitation vessel and then crushed in a crusher to obtain a low degree condensate of the polyester in powder form.

The obtained low degree condensate of the polyester had an inherent viscosity of 1.10 dl/g, and Tm of 320° C.

Subsequently, to a 500 ml rotary evaporator, 2 g of pellets (average diameter: 3 mm, average length: 4 mm) prepared in advance by compression molding the polyester having inherent viscosity of 3.20 dl/g and 40 g of the powder of low degree condensate of the polyester obtained were introduced and subjected to solid phase polymerization at 280° C. and 30 rpm under a vacuum of 0.13 kPa for 3 hours.

The obtained polyester had an inherent viscosity (IV) of 3.24 dl/g. Powder adhesion to a reactor wall was not observed at all and there was no stickiness due to resin agglomeration. Further, powder adhesion to a vacuum vent line was not observed.

Comparative Example 10

A polyester was prepared in the same manner as in Example 4 except that pellets were not added, but the low degree condensate in powder form was directly subjected to solid phase polymerization.

The obtained polyester had an inherent viscosity (IV) of 3.02 dl/g. Powder adhesion to a reactor wall was observed, but there was no stickiness due to resin agglomeration.

Results of the examples and comparative examples are summarized in Table 2.

TABLE 2

| | Kind of Polymer | Addition of pellet | IV of Low degree condensate (dl/g) | IV After solid phase polymerization (dl/g) | Adhesion of powder | Resin agglomeration |
|---|---|---|---|---|---|---|
| Example 7 | Polyamide | Yes | 0.16 | 0.83 | None | No |
| Comparative Example 7 | Polyamide | No | 0.16 | 0.75 | Very slightly | No |
| Example 8 | Polyamide | Yes | 0.06 | 0.78 | None | Very slightly |
| Comparative Example 8 | Polyamide | No | 0.06 | 0.71 | Large amount | Yes |
| Example 9 | Polycarbonate | Yes | 0.16 | 0.50 | None | No |
| Comparative Example 9 | Polycarbonate | No | 0.16 | 0.46 | Large amount | Yes |
| Example 10 | Polyester | Yes | 1.1 | 3.24 | None | No |
| Comparative Example 10 | Polyester | No | 1.1 | 3.02 | Large amount | No |

<Measurement of Inherent Viscosity IV (dl/g)>

In measurement of inherent viscosity, an Ubbelohde viscometer was used. Inherent viscosity of the polyamide was measured at 25° C. in concentrated sulfuric acid as a solvent, inherent viscosity of the polycarbonate was measured at 20° C. in dichloromethane as a solvent, and inherent viscosity of the polyester was measured at 60° C. in pentafluorophenol as a solvent.

<Measurement of Melting Point Tm (° C.)>

The melting point was determined by measuring an endothermic peak by melting at a flow rate of 10 Ml/min and a temperature increasing rate of 10° C./min under nitrogen atmosphere in DSC available from Seiko Instrument Co., Ltd.

What is claimed is:

1. A method for preparing a polycondensation resin, comprising:
   preparing a low degree condensate; and
   solid phase polymerizing the low degree condensate, wherein a granular molded article is provided upon solid phase polymerization and wherein the granular molded article has a particle diameter of 3 mm to about 30 mm.

2. The method according to claim 1, wherein the granular molded article is a granular compression-molded article of the low degree condensate.

3. The method according to claim 2, wherein the granular molded article of the low degree condensate is prepared by compression molding of the low degree condensate at about 10 MPa to about 800 MPa.

4. The method according to claim 2, wherein the solid phase polymerization is performed in a longitudinal tower type apparatus or a longitudinal tower type machine.

5. The method according to claim 1, wherein the granular molded article is a granular molded article of a thermoplastic resin.

6. The method according to claim 5, wherein the low degree condensate is prepared in the form of crystalline powder, and the crystalline powder of the low degree condensate and the granular molded article of the thermoplastic resin are mixed to carry out solid phase polymerization.

7. The method according to claim 5, wherein the thermoplastic resin is end-capped with an end capping agent.

8. The method according to claim 6, wherein the granular molded article of the thermoplastic resin is mixed in an amount of about 0.1 wt % to 10 wt % with respect to the crystalline powder of the low degree condensate.

9. The method according to claim 5, wherein the granular molded article of the thermoplastic resin is the same kind as the low degree condensate.

10. The method according to claim 5, wherein the granular molded article of the thermoplastic resin has an inherent viscosity of about 0.3 dl/g to about 5 dl/g as measured at a concentration of 0.5 g/dl.

11. The method according to claim 1, wherein the polycondensation resin comprises a polyamide, polycarbonate or polyester resin.

12. The method according to claim 1, wherein the solid phase polymerization has a maximum reaction temperature of about 170° C. to about 350° C.

13. The method according to claim 1, wherein the low degree condensate is prepared by polycondensation of a dicarboxylic acid and a diamine, and the moisture content in a reaction system is about 15 wt % to about 35 wt % at the end of polycondensation.

14. The method according to claim 13, wherein the preparing the low degree condensate is performed at a reaction temperature of about 230° C. to about 250° C.

15. The method according to claim 13, wherein the preparing the low degree condensate is performed at a pressure ranging from about 1.5 MPa to about 3.5 MPa for a reaction time ranging from about 0.5 hours to about 4.0 hours.

16. The method according to claim 13, wherein the low degree condensate is provided to solid phase polymerization after being discharged and cooled under an inert gas atmosphere and atmospheric pressure or less.

17. The method according to claim 16, wherein the cooled low degree condensate has an inherent viscosity of about 0.07 dl/g to about 0.20 dl/g as measured at 25° C. and at a concentration of 0.5 g/dl in concentrated sulfuric acid, and 5 wt % reduction temperature of about 300° C. or more as measured by thermogravimetry under nitrogen atmosphere.

18. The method according to claim 16, wherein the inert gas has an oxygen concentration of about 1% by volume or less, and, in the cooling, the low degree condensate is cooled to about 100° C. or less.

19. The method according to claim 13, wherein the dicarboxylic acid comprises about 30 mol % to about 100 mol % of terephthalic acid and about 0 to about 70 mol % of dicarboxylic acid except for terephthalic acid, the diamine comprising about 50 mol % to about 100 mol % of a $C_4$ to $C_{25}$ aliphatic alkylene diamine and about 0 to about 50 mol % of a $C_3$ to $C_{25}$ cycloaliphatic diamine.

\* \* \* \* \*